Feb. 22, 1955   N. FELICI   2,702,869
ELECTROSTATIC GENERATOR MACHINE
Filed Aug. 19, 1953
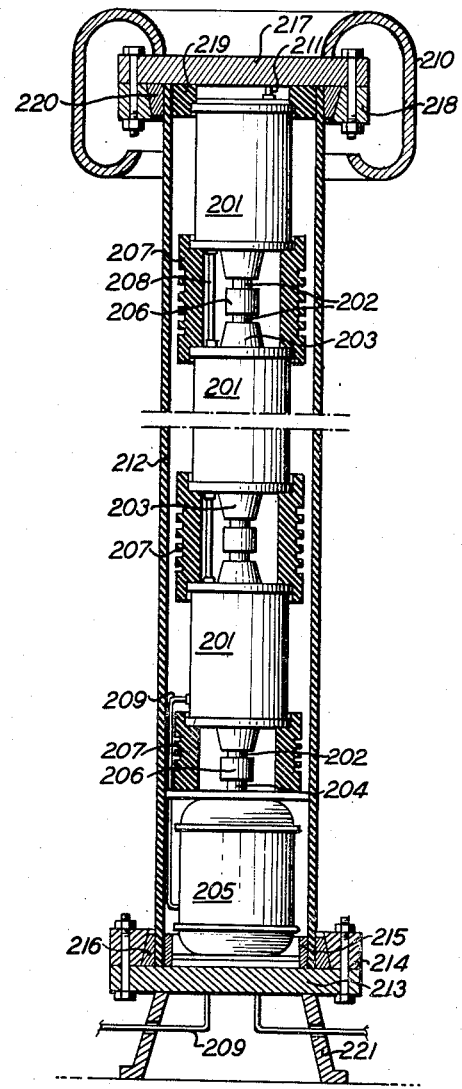
INVENTOR
NOEL FELICI
BY *George H. Cory*
ATTORNEY United States Patent Office 2,702,869
Patented Feb. 22, 1955

2,702,869

ELECTROSTATIC GENERATOR MACHINE

Noël Felici, Grenoble, France, asssignor to Centre National de la Recherche Scientifique, Paris, France, a corporation of France Application August 19, 1953, Serial No. 375,274

Claims priority, application France August 20, 1952

11 Claims. (Cl. 310—6)

The present invention relates to electrostatic influence generator machines of the type described in the applicant's copending application Serial No. 249,231, filed October 2, 1951, now Patent No. 2,675,516, issued April 13, 1954, which are capable of supplying very high voltage.

Said machines fundamentally comprise several juxtaposed units, each of which comprises a rotor consisting of one or more conductive carrier members and of a stator consisting of one or more conductive inductor members. The inductors are respectively connected to an input terminal and to an output terminal of the considered unit, the output terminal of one unit being connected to the input terminal of the following unit, the input terminal of the first unit and the output terminal of the last unit constituting the terminals of the machine and the first unit being arranged to be excited by an external voltage supply, whereas another unit or all the remaining units are arranged to be excited by at least one of the other units of the machine.

According to a particular embodiment described in said Patent No. 2,675,516, all the generator units are enclosed in an air-tight metallic casing, thus providing the possible working of the units in a fluid having a high dielectric strength such as a gas under a high pressure. For machines providing high output voltages such a casing, however, leads to difficulties where insulation is concerned and this complicates the manufacture of the machine and increases its bulk.

In order to do away with such difficulties, it has been proposed according to another embodiment to use a casing at least partly made of an insulating material. The manufacture of such an insulating casing has also met with some difficulties. The use of plastics is very costly and when the casing is made of layers of paper, cardboard or any similar material, whether impregnated or not, experience has proved that the high pressures which are necessary for a good operation of the machine, and which may reach 15 to 30 atmospheres, cannot be supported by such a casing. This is a heavy drawback when very high voltages are obtained in the series coupling.

According to the present invention, and in order to obviate all these inconveniences, the generator units are enclosed, individually or in groups each comprising a fraction of the total number of units in an air-tight metallic casing filled with a gas under a pressure of 15 to 30 atmospheres, the shafts of the rotors of such units which pass through said casings by means of stuffing-boxes being coaxially interconnected by means of insulating couplings and the whole of said encased units being enclosed in a general casing made of insulating material and containing a gas under a pressure below about 10 atmospheres.

Thus, each unit or group of units may work in a medium having a high dielectric strength providing the possibility of supplying a high voltage, for instance of the order of 200 to 500 kilovolts, the obtaining of the resistance of the casing to high pressures which are necessary to this end being no more a difficult problem. On the other hand, the outer main casing is subjected to much lower internal pressure which, however, is sufficient for insuring the insulation of the encased units with regard to the ground or to the operators who handle the machine.

The internal atmosphere of the individual metallic casings is, for instance, constituted by hydrogen under a pressure of 20 atmospheres. That of the main casing made of insulating material may be constituted, for instance, of impure nitrogen under a pressure of 5 atmospheres or of nitrogen with carbon tetrachloride, or even of Freon, under a pressure of 2 to 3 atmospheres. This main outer casing may thus be formed of a tube of paper or of cardboard which it is easy to manufacture in order that it may resist a pressure reaching 10 atmospheres.

The appended drawing represents a vertical section of an embodiment of a machine according to the present invention. In this machine, the constitution of the individual generator units, as well as their electrical interconnections, are the same as in the machines which have been described and represented in the above mentioned Patent No. 2,675,516. For this reason, they have not been represented here in detail. These generator units are enclosed, individually or by groups comprising, for example, two units, in an air-tight aluminum casing 201 of cylindrical shape. Each of these casings is filled with hydrogen under a pressure of 20 atmospheres. The shafts 202 of the rotors of said units pass through casings 201 by means of stuffing-boxes 203 of any known type capable of preventing leakage under the above mentioned pressure, for example oil filled stuffing-boxes. These shafts are interconnected and connected to shaft 204 of the driving motor 205 by means of insulating couplings 206. Casings 201 rest upon one another, as well as upon the casing of driving motor 205, by means of insulating crowns 207, for example made of soap-stone. The electrical connection between the units which are enclosed in the respective casings is insured by insulated conductors 208 which pass said casings in an air-tight manner. A conductor 209 connects the external excitation supply to the first unit or units, located at the lower part of the machine, whereas the last unit located at the top of said machine is connected to the insulated conductive terminal 210 of the machine by means of a conductor 211.

The assembly of aligned generator units, couplings and crowns shown in the drawing is enclosed in a rigid insulating tube 212 which may be formed conventionally of laminated layers of paper bonded together by suitable bonding material. This tube extends, as shown, between a base in the form of a solid metal disc 213 and a top closing metal disc 217. The driving motor 205 disposed within the tube 212 in this embodiment is supported on the disc 213 and supports at its upper end the lowermost insulating crown 207, each of the successive casings 201 and crowns 207 supporting the units disposed thereabove.

The lower end of the tube 212 is reinforced by an internal metal sleeve 215. A ring 214 is fastened by bolts, as shown, to the metal disc 213 exteriorly of the tube 212, this ring 214 having a conical inner circumference which bears upon an annular packing 216 of corresponding conical shape to effect gripping of the lower end of the tube by the packing upon tightening of the bolts, thereby securing the pressure tightness between the tube and the closing elements disposed at the lower end of this tube. Similarly at the upper end of the tube 212 an insulating ring 219 is disposed within the tube 212 and engages the upper end of the uppermost unit 201. Pressure tightness is secured at this end of the tube 212 similarly to the lower end by means of the external ring 218 having a conical inner surface and the conical annular packing 220 upon tightening of the bolts extending through the ring 218 and the upper disc 217.

The conductor 209 which, in accordance with the disclosure in the Patent 2,675,516, may connect the external excitation supply to the first unit, passes through the disc 213 in air tight relation thereto and insulated therefrom, such air tightness and insulation being provided by conventional sealing means.

Similarly the electrical connection or connections for the driving motor 205 may be carried through disc 213 or brought to the motor in other suitable manner providing for pressure tightness and insulation. The output connection 211 from the uppermost unit 201 is electrically connected to the disc 217 to which the hollow torus 210 is welded, this torus 210 constituting the output terminal of the machine and being insulated from the disc 213, which may be grounded and may be the input terminal of the machine, and from other conductive parts of the machine by virtue of the insulating tube 212 and the insulating ring 219 and crowns 207. The whole machine is supported upon the grounded base 221 on which the disc 213 bears.

What I claim is:

1. An electrostatic generating machine which comprises an electrostatic generating unit, a casing enclosing said generating unit and confining in said casing a fluid pressure medium at a substantially elevated pressure for operation of said electrostatic generating unit in said fluid pressure medium, an envelope enclosing said electrostatic generating unit and confining within said envelope exterior to said casing a fluid pressure medium at a pressure less than said elevated pressure, and means operatively connected to said generating unit and said casing and said envelope for operating said generating unit within said casing and envelope while confining the respective fluid pressure media within said casing and said envelope.

2. An electrostatic generating machine which comprises a plurality of electrostatic generating units, each of said generating units being enclosed in a casing confining therein a fluid pressure medium at a pressure elevated substantially above atmospheric pressure for operation of said electrostatic generating unit in said fluid pressure medium, an envelope enclosing said plurality of generating units and confining within said envelope exterior to said casings a fluid pressure medium at a pressure less than the pressure of said fluid pressure medium within said casings of said generating units, and means operatively connected to said generating units and said casings and said envelope for operating said generating units within said casings and envelope while confining the respective fluid pressure media in said casings and in said envelope.

3. An electrostatic generating machine which comprises a plurality of electrostatic generating units each having a rotor rotatable on an axis with respect to a stator, said axes of said generating units being disposed in generally aligned relation with said units in spaced relation to each other along said aligned axes, each of said generating units being enclosed in a casing confining therein a fluid pressure medium at a substantially elevated pressure for operation of said electrostatic generating unit in said fluid pressure medium, a tubular envelope extending about said plurality of generating units and along said aligned axes, means connected to said tubular envelope and cooperating therewith to confine within said envelope a fluid pressure medium at a pressure less than the pressure of said fluid pressure medium within said casings of said generating units, and means operatively connected to said rotors of said generating units and operable for effecting rotation of said rotors while confining the respective fluid pressure media in said casings and in said envelope.

4. An electrostatic generating machine as defined in claim 3 in which said axes of said rotors are coaxial and said tubular member is coaxial with the common axis of said rotors.

5. An electrostatic generating machine defined in claim 4 in which the rotors of adjacent generating units respectively have shafts extending toward each other through the casings of said adjacent generating units, coupling means connecting said shafts of said adjacent units for effecting rotation of one upon rotation of the other, and stuffing boxes respectively extending about and engaging said shafts and engaging the respective casings for confining said fluid pressure medium at said higher pressure within said casings while providing for rotation of said shafts.

6. An electrostatic generating machine as defined in claim 1 in which said envelope is of insulating material.

7. An electrostatic generating machine as defined in claim 3 in which said tubular envelope is of insulating material, and means disposed adjacent the ends of said tubular envelope for confining therein the fluid pressure medium of lower pressure, said confining means providing also the terminal electrodes of said electrostatic generating machine.

8. An electrostatic generating machine as defined in claim 3 which comprises a motor disposed within said tubular envelope and operatively connected to said rotors for effecting rotation of said rotors.

9. An electrostatic machine according to claim 1 in which said internal casings each enclose one of the generating units.

10. An electrostatic machine according to claim 1, in which said outer envelope is an insulating member made of superposed layers of paper.

11. An electrostatic machine according to claim 1, in which said outer envelope is an insulating member made of cardboard.

No references cited.